US008494981B2

(12) United States Patent
Harrison et al.

(10) Patent No.: US 8,494,981 B2
(45) Date of Patent: Jul. 23, 2013

(54) REAL-TIME INTELLIGENT VIRTUAL CHARACTERS WITH LEARNING CAPABILITIES

(75) Inventors: Gregory A. Harrison, Oviedo, FL (US); Thomas Wonneberger, Orlando, FL (US); Jason Tr Smith, Orlando, FL (US); David S. Maynard, Orlando, FL (US); Eric W. Worden, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 397 days.

(21) Appl. No.: 12/819,574

(22) Filed: Jun. 21, 2010

(65) Prior Publication Data
US 2011/0313955 A1    Dec. 22, 2011

(51) Int. Cl.
*G06F 15/18* (2006.01)
(52) U.S. Cl.
USPC ............................................................ 706/12
(58) Field of Classification Search
None
See application file for complete search history.

(56) References Cited

U.S. PATENT DOCUMENTS

| | | | |
|---|---|---|---|
| 4,697,242 A * | 9/1987 | Holland et al. .................. | 706/13 |
| 5,400,244 A * | 3/1995 | Watanabe et al. ............... | 701/28 |
| 6,076,099 A | 6/2000 | Chen et al. | |
| 6,741,974 B1 | 5/2004 | Harrison et al. | |
| 7,094,153 B2 * | 8/2006 | Kunieda et al. ................. | 463/32 |
| 7,319,992 B2 | 1/2008 | Gaos | |
| 7,528,835 B2 | 5/2009 | Templeman | |
| 7,663,628 B2 * | 2/2010 | Cederwall et al. ............. | 345/473 |
| 7,953,521 B2 * | 5/2011 | Tipping et al. .................... | 701/1 |
| 8,128,498 B2 * | 3/2012 | Aguilar et al. .................. | 463/36 |
| 2005/0071306 A1 * | 3/2005 | Kruszewski et al. ........... | 706/47 |
| 2007/0162405 A1 * | 7/2007 | Parunak et al. ................. | 706/12 |
| 2009/0216695 A1 * | 8/2009 | Baum .............................. | 706/13 |
| 2011/0099130 A1 * | 4/2011 | Blumberg et al. .............. | 706/12 |

OTHER PUBLICATIONS

Khoo et al, Efficient, Realistic NPC Control Systems using Behavior-Based Techniques, 2002.*
Arkin, Motor Schema Based Navigation for a Mobile Robot: An Approach to Programming by Behavior, 1987.*
Rosenblatt, DAMN: A Distributed Architecture for Mobile Navigation, 1995.*
Small, Agent Smith: a Real-Time Game-Playing Agent for Interactive Dynamic Games, 2008.*
Bonarini et al, An architecture to coordinate fuzzy behaviors to control an autonomous robot, 2003.*

* cited by examiner

*Primary Examiner* — Jeffrey A Gaffin
*Assistant Examiner* — Mikayla Chubb
(74) *Attorney, Agent, or Firm* — Terry M. Sanks, Esq.; Beusse Wolter Sanks Mora & Maire, P.A.

(57) ABSTRACT

A system, method, and computer-readable instructions for real-time characters with learning capabilities. A plurality of rules are defined in a rules-based system, each of the rules defining a condition that determines a behavior of a virtual agent when the rule is triggered by the condition being satisfied so that upon triggering of multiple rules at the same time, each of the behaviors of the multiple rules whose conditions were satisfied are combined into a resultant behavior for the virtual agent. This resultant behavior is compared with a desired behavior to providing feedback in the form of rewards or punishments to each of the multiple rules based on their corresponding contribution to the resultant behavior as compared to the desired behavior.

20 Claims, 3 Drawing Sheets

REAL-TIME INTELLIGENT VIRTUAL CHARACTERS WITH LEARNING CAPABILITIES

TECHNICAL FIELD

The invention pertains to systems and methods having real-time characters with learning capabilities. More particularly, the invention pertains to such systems and methods that incorporate genetic algorithms, learning classifier systems and agent technology in the realization of a complex adaptive system having real-time characters with learning capabilities.

BACKGROUND ART

Genetically programmed Learning Classifier Systems (LCS) for Complex Adaptive Systems (CAS) are known. One such system and method are disclosed in U.S. Pat. No. 6,741, 974 "Genetically Programmed Learning Classifier System for Complex Adaptive System processing with agent-based architecture" which was filed Jun. 2, 2000 and is assigned to the assignee hereof. The disclosure of the '974 patent is hereby incorporated herein by reference.

The '974 patent describes a system and a method enabling a software agent to learn about its environment, and learn how to perform jobs and tasks. Information is assimilated and used in an adaptive manner by the genetically evolving rule set of the agent. The agent learning system communicates with the external environment in an artificial economy through on-line auctions. Internal information also passes through message auctions that provide chaining of rule execution. The agent continually attempts to automatically improve its performance with respect to fitness for a job.

Complex Adaptive Systems (CAS) contain many components that interact and adapt both as a result of external agency or from the occurrence of internal events. The term agent can be applied to any entity, biological, mechanical, or otherwise, that can perform actions, intelligent or not. In CAS, agents are designed to perceive their environment through its detectors and take action on its perception through its effectors. In agent-based systems, system intelligence is contained in locally encapsulated software entities, or agents, and is thus portable and dedicated to given tasks. Individual agents can adapt without changing the rest of the system. An agent is a self-contained entity in a complex adaptive system (CAS). Each agent is able to accomplish given tasks within a software environment. The use of multiple agents allows interaction and parallel execution of multiple tasks in diverse locations throughout the system. The intrinsic parallelism provides enhanced system robustness.

Many methods of controlling adversaries in virtual worlds have been designed, with varying levels of intelligence. Activities typically have been processed through static goal-driven command structures. In cases of training, and analysis of military scenarios, virtual characters that do not adapt to the changing environment provide poor adversaries, since they always tend to operate with the same plans and performance criteria, like a semi-automated forces simulation.

Modeling the battlefield as a complex adaptive system allows intelligent agents to adapt to perform their programs better. If these agents are expected to carry out missions but also to destroy each other as possible, then they will develop skills that enable them to hunt and evade as needed.

A number of patents exist which relate to controlling adversaries in virtual worlds and intelligent agents, including, U.S. Pat. Nos. 6,741,974, 6,076,099, 7,094,153, 7,319,992, 7,528,835, all of which are incorporated herein by reference. However, these patents fail to provide real-time adaptive evolutionary software to control the agents to provide new capabilities.

The present invention is designed to address these needs.

SUMMARY OF THE INVENTION

Broadly speaking, an improved system, method, and computer-readable instructions for real-time characters with learning capabilities. Reward and punishment mechanisms are included in the CAS to allow the agents to learn from their behaviors, such that those behaviors that are rewarded tend to be repeated, and those behaviors that were punished tend to be stopped. The agents use a learning classifier system (LCS) that is built with Genetic Programming (GP). The learning system may be termed LCSGP.

The invention can be implemented in numerous ways, including as a system, a device/apparatus, a method, or a computer readable medium. Several embodiments of the invention are discussed below.

In an embodiment, the invention provides a method for controlling a virtual character in a virtual space comprising: defining a plurality of rules in a rules-based system, each of said rules having a part that defines a condition that determines a behavior of a virtual agent when the rule is triggered by the condition being satisfied; upon triggering of multiple rules at the same time, combining each of the behaviors of the multiple rules whose conditions were satisfied into a resultant behavior for the virtual agent; comparing the resultant behavior with a desired behavior; and providing feedback to each of the multiple rules based on their corresponding contribution to the resultant behavior as compared to the desired behavior.

In a further embodiment, the rules based system comprises a set of if-then rules that are triggered when the condition returns true. The method may be implemented in a Learning Classifier System where multiple rules are adapted to fire at once where the multiple rules fire at once depending on a state of the virtual character and one or more states external to the virtual character. The behavior may be a movement in virtual space having a speed and direction where the speed and direction may be defined by a two-dimensional or three-dimensional speed vector. The behaviors can be combined by a vector sum of the two-dimensional or three-dimensional speed vectors. The comparison with the desired behavior can then be vector based. The feedback may be a reward or punishment based on the rule's corresponding contribution to the resultant behavior as compared to the desired behavior.

The method may also include implementing the resultant behavior for the virtual character. The implemented resultant behavior can be detected to determine its effectiveness in the virtual space when subjected to environmental influences of the virtual space so that further feedback can be provided in the form of a reward or punishment. The further feedback may be issued at the end of a real-time period before a next epoch starts. The method may also include a behavior reward for the actual behavior that was implemented. The feedback provides for a rule fitness adapted to be considered in a genetic operation with respect to how each rule contributed to the resultant behavior.

In another embodiment, the invention provides a tangible computer readable medium having instructions thereon for implementing a method for controlling a virtual character in a virtual space comprising: defining a plurality of rules in a rules-based system, each of said rules defining a condition that determines a behavior of a virtual agent when the rule is triggered by the condition being satisfied; upon triggering of multiple rules at the same time, combining each of the behaviors of the multiple rules whose conditions were satisfied into a resultant behavior for the virtual agent; comparing the resultant behavior with a desired behavior; and providing feedback to each of the multiple rules based on their corresponding contribution to the resultant behavior as compared to the desired behavior.

In further embodiments of the tangible computer readable medium, the behavior can be a movement in virtual space having a speed and direction defined by a two-dimensional or three-dimensional speed vector, wherein the behaviors are combined by a vector sum of the two-dimensional or three-dimensional speed vectors. The feedback may be a reward or punishment based on the rule's corresponding contribution to the resultant behavior as compared to the desired behavior.

In still another embodiment, the invention provides a virtual reality system having a virtual character in a virtual space, comprising: a processor (one or more processors); a memory comprising a plurality of rules in a rules-based system, each of said rules defining a condition that determines a behavior of a virtual agent when the rule is triggered by the condition being satisfied, wherein the program instructions are executable by the processor to: upon triggering of multiple rules at the same time, combine each of the behaviors of the multiple rules whose conditions were satisfied into a resultant behavior for the virtual agent; compare the resultant behavior with a desired behavior; and provide feedback to each of the multiple rules based on their corresponding contribution to the resultant behavior as compared to the desired behavior.

In further embodiments of the virtual reality system the behavior may be a movement in virtual space having a speed and direction defined by a two-dimensional or three-dimensional speed vector, wherein the behaviors are combined by a vector sum of the two-dimensional or three-dimensional speed vectors. The feedback can be a reward or punishment based on the rule's corresponding contribution to the resultant behavior as compared to the desired behavior.

A computer program product is also provided that comprises a computer usable medium having a computer readable program code embodied therein, adapted to be executed by a processor to implement the methods of the invention. The invention may include a number of software components, such as a logic processing module, configuration file processing module, data organization module, and data display organization module, that are embodied upon a computer readable medium.

The advantages of the invention are numerous. One significant advantage of the invention is the use of real-time adaptive evolutionary software to control the agents which provides new capabilities. The solution learns from the environment and writes its own programs. The agents evolve using a Learning Classifier System implemented with Genetic Programming, and develop rules that interact with the environment. Intelligent real-time response to events and states in the environment are critical for survivability and realism in real-time interaction with the agent. By being able to adapt, this will provide a more realistic scenario to the warfighter, both for training and for course of action testing.

This solution adapts to changes in the environment without having to have a person rewrite the code. It develops and tests its own software automatically.

This solution takes a Complex Adaptive System that allows the Intelligent Agent to rewrite its own behaviors based on the simulation environment. It uses the Complex Adaptive System paradigm as a means for the intelligent agents to interpret the environment in which they are running. This includes inter-agent co-dependent learning which applies fitness pressure in order to guide the evolution of emergent phenomena towards a desired outcome.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENT

Figure 1:
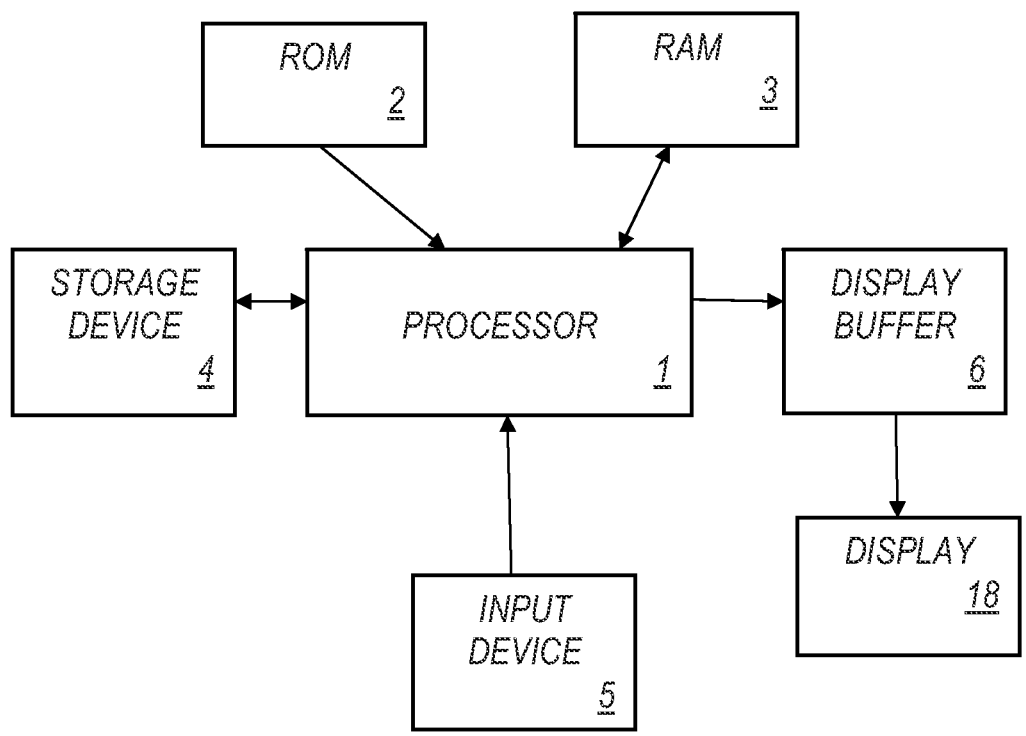
FIG. 1 is a block diagram of a general purpose computer system that is programmed by the techniques of the present invention.

Referring now to the drawings, the preferred embodiment of the present invention will be described.

Referring now to FIG. 1, an exemplary computer system on which the software techniques of the present invention runs is described. Generally, the image rendering techniques of the present invention may be implemented by a general purpose computing device/computer programmed to carry out the specific methods set forth herein. Typically, such a general purpose computer comprises a processor 1 which is connected to either or both a read-only-memory 2 and/or a random-access-memory 3. The read-only-memory 2 stores program instructions and data of a permanent nature. The random-access-memory 3 is used to store program instructions and data temporarily in response to commands from the processor 1. For example, the random-access memory 3 may store particular programs or segments of programs used to carry out specific functions, the processor 1 being response to the stored programs to carry out the functions of the programs as if the processor were a hardwired, dedicated device. Additionally, the random-access memory 3 may be used to store current data or intermediate results in a manner well known in the art.

The computer system also has one or more storage devices 4, such as a hard disk drive, CD-ROM, floppy drive or other storage media connected to the processor. The storage device 4 may contain programs that are accessed by the processor to program the process to perform specific functions as well as data to be used by programs, such as the present invention.

The processor 1 receives operator input from one or more input devices 5, such as a keyboard, joystick or mouse. Acting on the operator input, the processor 1 performs various operations and writes the output of such operations to the display buffer 6, also called video memory. The contents of the display buffer 6 or video memory are written to the display 18, forming an image on the display 18.

A plurality of computers may be networked for operation of the present invention. Many types of computers can be used in this system, including those running Unix, or Windows operating systems. The software in a preferred embodiment may be written in Java, for example. Hence, it should be executable on any system that supports Java and has sufficient resources to support the agent learning system. The computers may be embedded, such as in an aircraft or tank. Alternately, they may be desktop systems, server systems, or laptops. There is no requirement for a human-readable display or input device, although these devices would allow a human user to interact with the system, and are supported. The system establishes a virtual world or society inside of the networked computer systems. This virtual world supports the operation and reproduction of mobile, autonomous, software agents. The computers can be distributed throughout a digital communications system. In one embodiment, this network includes an intranet running TCP/IP. While the system is executable on a single computer, a networked embodiment can use a distributed system to allow intelligent agents to traverse the network. At least one agent site is supported on each computer in the plurality. The agent site is preferably implemented as a software process that enables agents to execute their code at a respective computer. It provides agent intercommunication and administration and allows the agents to execute as parallel execution threads on a single computer. Multiple sites can be supported and run on a single computer. Alternately, the sites could be located on distributed computers, perhaps at great geographical distances from each other.

A simulator can be incorporated into the site to enhance learning operations. Because machine learning requires many trials to learn a task, the simulator relieves the system from the burden of having multiple agents issue repetitive queries on interfaces or dispatching repetitively to different sites throughout the environment. Without a simulator, the network could be burdened by the learning process. The simulator provides a dynamically updated replica of the environment that statistically models the results provided from various external resource applications. The agent can enter the simulator regularly, both to learn new jobs and to continually train and refine its capabilities. For instance if an agent learned to perform job A, but the environment changed such that a particular step of job A no longer causes the correct response, this information would be reflected in the simulation. The fitness of the agent would drop due to lack of a correct response, thus causing the agent to enter simulator to attempt to determine how to perform the job successfully again.

The agents, or characters, are created from an evolutionary-computation-based learning system. See, for example, U.S. Pat. No. 6,741,974 "Genetically Programmed Learning Classifier System for Complex Adaptive System processing with agent-based architecture," incorporated herein by reference in its entirety, which describes a system and a method enabling a software agent to learn about its environment, and learn how to perform jobs and tasks. Information is assimilated and used in an adaptive manner by the genetically evolving rule set of the agent. The agent learning system communicates with the external environment in an artificial economy through on-line auctions. Internal information also passes through message auctions that provide chaining of rule execution. The agent continually attempts to automatically improve its performance with respect to fitness for a job.

The environment is also augmented to provide means for the agent to reason about the environment. The combination of all agents and the environment is termed a Complex Adaptive System. An external message board and the ability to integrate various sensor capabilities are joined with an agent learning system that evolves behavior in response to repeated simulations of the current situation.

The agent behaviors are in the form of a set of rules that may fire based upon a virtual economy that defines the strength and order of rule firing. The rule strength is joined with sensory information provided by the virtual battlefield or gaming environment to determine the current rules to fire. For example, in order to fire, the individual rule has to match and purchase at least one message, on either the internal or external rule list. Rule strength is controlled through adaptation to a complex adaptive system model of the environment that also supplies rewards and punishments. This invention allows the operating performance of the agent to improve over time, getting more rewards and fewer punishments. The rule-set is processed at a real-time rate, with additional learning algorithms occurring in parallel. Multiple agents have an interlaced communication stream through artificial economy bidding and external message boards.

The system adds hard real-time control to perform the processing of the LCS epochs at a periodic rate, and methods of reward distribution and sensing. It allows the agents to operate in a 3D environment with real-time time progression and natural physics.

The agent rules are generated automatically up to a certain number, N per agent.

The rules comprise antecedent (IF) parts and consequent (THEN) parts. For each antecedent and each consequent, there is an internal and an external section. The internal section creates internal state machines and operates or checks internal facilities. The external sections work with the external world or simulator, both to sense the state of the world and to perform operations, such as movement, within that environment.

In a Learning Classifier System (LCS) multiple rules may fire at once depending on the state of the agent and the external stimulus.

This could be seen as in Table 1.

TABLE 1

|  | IF | THEN | Wallet |
|---|---|---|---|
| Rule 1 | Returns True | Move (45°, fast) | $100 |
| Rule 2 | Returns False | Does not matter | $100 |
| Rule 3 | Returns True | Move (30°, slow) | $100 |
| Rule 4 | Returns False | Does not matter | $100 |
| Rule 5 | Returns True | Move (−12°, medium) | $100 |

Thus, Rule 1, 3, and 5 will execute, and the following commands will need to be executed in this epoch:

| Move (45°, fast) | Rule 1 |
|---|---|
| Move (30°, slow) | Rule 3 |
| Move (−12°, medium) | Rule 5 |

Figure 2:
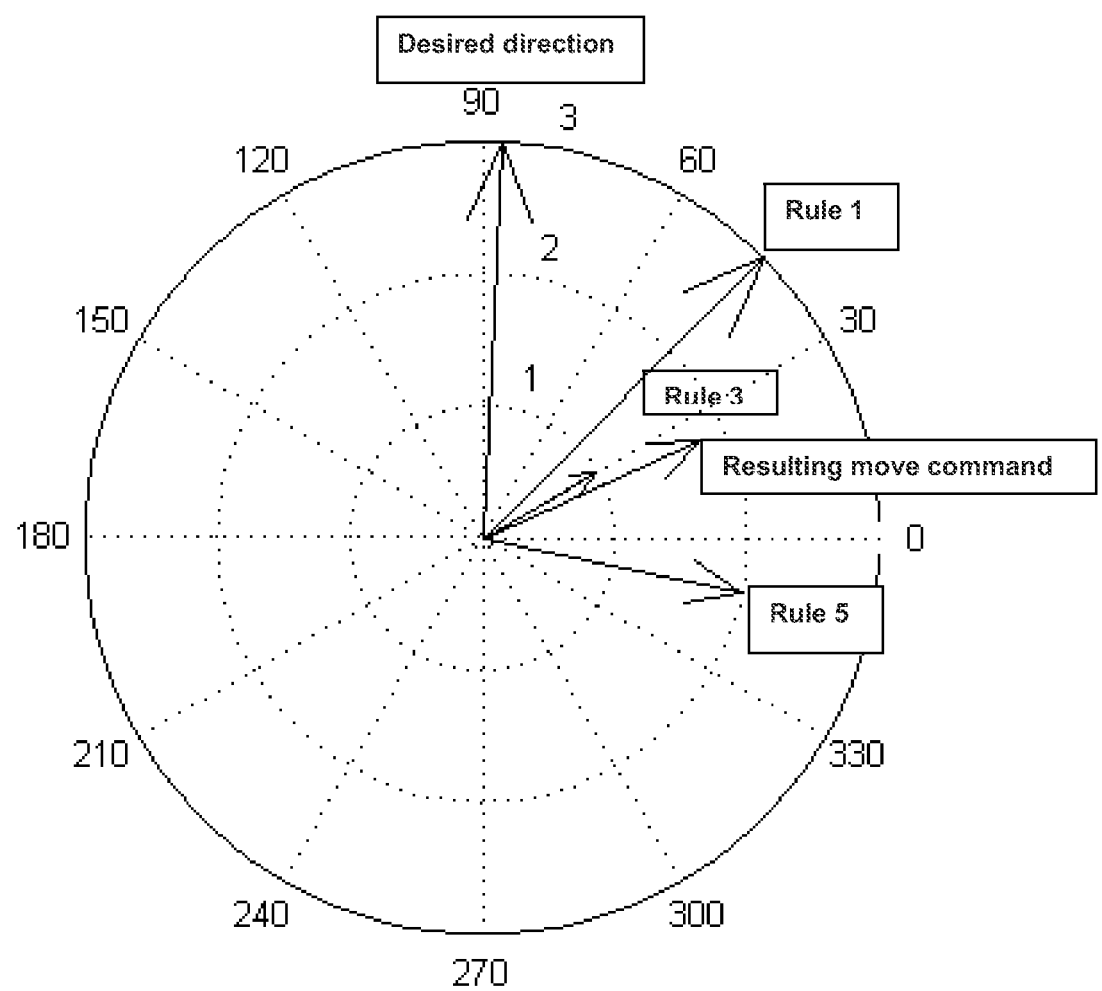
FIG. 2 is an illustration of the speed vectors in an embodiment of the invention.

These movement commands may be combined into a resultant move, first substituting a numerical value for the textual energy values such as:

fast=3 Newtons
med=2 Newtons
slow=1 Newtons and a resulting 2-dimensional speed vector sum may be seen in FIG. 2.

Since the LCS learns from the feedback, also termed fitness or reinforcement, the individual rules need to be rewarded or punished based upon how they contributed to the resulting move function.

Thus, all rules are rewarded or punished proportionally to how they contribute to moving in the direction that is desired, as shown in FIG. 2.

Use the dot product to calculate the contribution of each move vector to movement in the desired direction.

$$|\text{Rule 1}|\cos(\angle \text{rule1} - \angle \text{desired direction}) \approx \text{reward for rule 1}$$

In the case of FIG. 2, if the desired direction is 82 degrees, then the reward for rule 1 is as follows:

$$\begin{aligned}\text{Reward for Rule 1} &= |\text{fast}|\cos(45° - 87°)\\ &= 3*\cos(-42)\\ &\approx 3*0.7431448 \approx 2.2294\end{aligned}$$

$$\begin{aligned}\text{Reward for Rule 3} &= |\text{slow}|\cos(30° - 87°)\\ &= 1*\cos(-57)\\ &\approx 1*0.544639 \approx 0.5446\end{aligned}$$

$$\begin{aligned}\text{Reward for Rule 5} &= |\text{medium}|\cos(-12° - 87°)\\ &= 2*\cos(-99)\\ &\approx 2*(-0.1564345) \approx -0.3129\end{aligned}$$

Thus, each rule is rewarded based upon its contribution to the desired movement. This then allows the rule fitness to be considered in the genetic operations with respect to how each rule contributed to the move. This could be seen as in Table 2.

TABLE 2

|  | IF | THEN | Wallet |
|---|---|---|---|
| Rule 1 | Returns True | Move (45°, fast) | $100 + $2.2294 |
| Rule 2 | Returns False | Does not matter | $100 |
| Rule 3 | Returns True | Move (30°, slow) | $100 + $0.5446 |
| Rule 4 | Returns False | Does not matter | $100 |
| Rule 5 | Returns True | Move (−12°, medium) | $100 − $0.3129 |

Since this is a real-time system, the resulting move command is applied to the agent in the environment and the system is allowed to process for a limited duration $\Delta T$, where $\Delta T$ is the cognition time for the system. During this period, the actual movement of the agent is detected, and a subsequent award is provided to help the agent determine if it has been effective in its efforts as expressed in the environment. There may be slippery mud, or the agent could be on an upslope, where the same amount of energy does not result in as large a forward motion as would occur on level ground.

After processing the LCS epoch, where all rules are given a chance to fire, if they are going to, and all move commands are summed into a resulting move command, and rewards issued for direction, then the resulting move command is applied to the agent in the environment, and during the period from issuing the move command to the beginning of the next real-time epoch of LCS state machine operation, (which can occur every 300 msec as a representative duration) the actual movement of the agent is measured. The agent movement is gauged on direction and speed, and can be influenced by physics such as terrain slope and traction in the environment. A new reward is issued at the end of the real-time period before the next epoch starts. There is also a reward for the actual move that occurred. This happens at the end of every epoch just after the 300 ms sleep. The current distance to the agent's objective is compared against how far it was at the beginning of the epoch. The difference is calculated and an overall reward or punishment is determined based on the magnitude of the difference.

The end of real-time period reward is issued to all the rules that perform the job. This may be considered an optional form of reward, as it could also issue the reward in the same proportions that the original reward was issued.

While the above described method and system could be implemented in accordance with the teachings of the '974 patent, those of skill will understand that other implementations could also be used without departing from the spirit and scope of the invention.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile/video disc (DVD). The present invention can be configured for use in a computer or an information processing apparatus which includes a memory, such as a central processing unit (CPU), a RAM and a ROM as well as a storage medium such as a hard disc.

Figure 3:
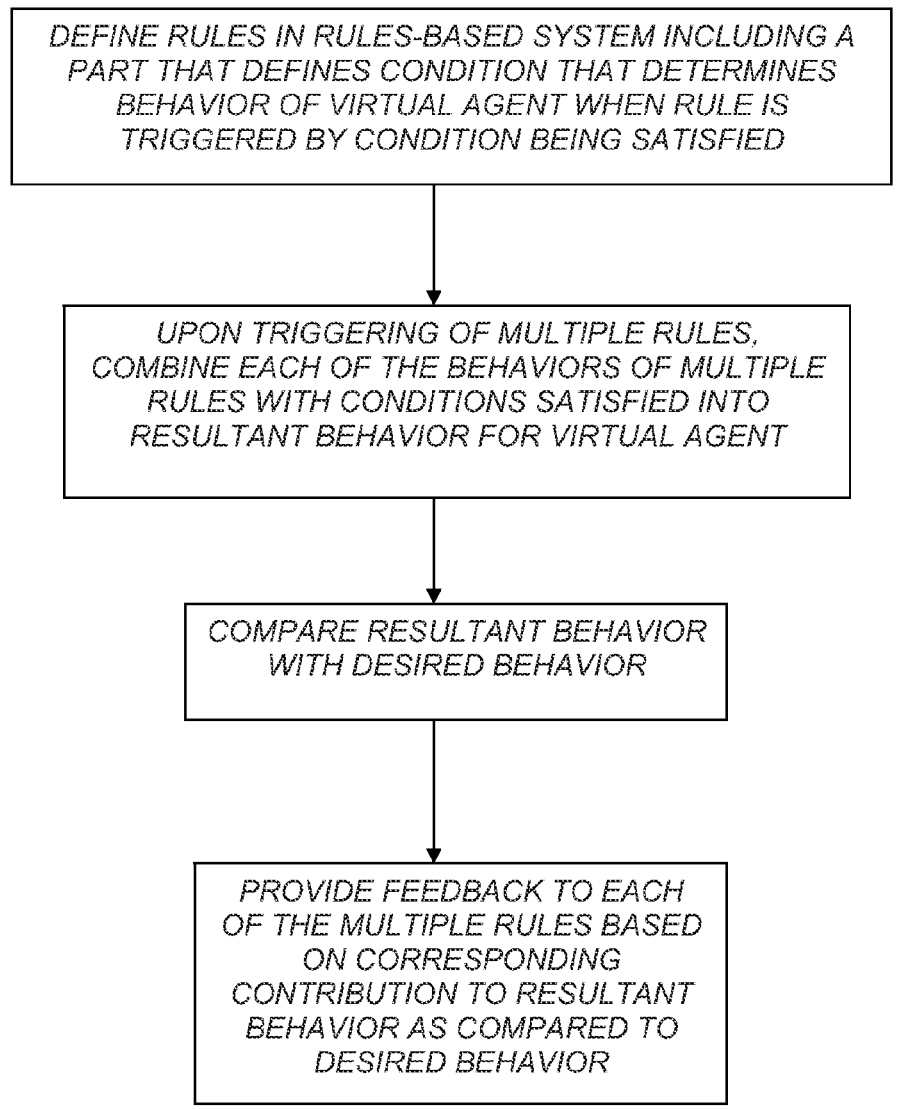
FIG. 3 is a flow chart illustrating an embodiment of the invention.

The "step-by-step process" for performing the claimed functions herein is a specific algorithm, and may be shown as a mathematical formula, in the text of the specification as prose, and/or in a flow chart as in FIG. 3. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It should be understood that the examples and embodiments described herein are for illustrative purposes only and that various modifications or changes in light thereof will be suggested to persons skilled in the art and are to be included within the spirit and purview of this application.

What is claimed is:

1. A method for controlling a virtual character in a virtual space comprising:
    defining a plurality of rules in a rules-based system, each of said rules having a part that defines a condition that determines a consequent behavior of a virtual agent when the rule is triggered by the condition being satisfied;
    upon triggering of multiple rules at the same time, combining all of the consequent behaviors of the multiple rules whose conditions were satisfied into a resultant behavior for the virtual agent rather than selecting one of the consequent behaviors, so that the resultant behavior comprises a new combined operation for execution within the virtual space where each of the consequent behaviors partly contributes to the new combined operation;
    comparing the resultant behavior with a desired behavior; and
    providing feedback to each of the multiple rules based on a proportional amount of their corresponding contribution to the resultant behavior as compared to the desired behavior.

2. The method of claim 1 wherein the rules based system comprises a set of if-then rules that are triggered when the condition returns true.

3. The method of claim 1 wherein the method is implemented in a Learning Classifier System where multiple rules are adapted to fire at once.

4. The method of claim 3 wherein the multiple rules fire at once depending on a state of the virtual character and one or more states external to the virtual character.

5. The method of claim 1 wherein the consequent behavior is a movement in virtual space having a speed and direction.

6. The method of claim 5 wherein the speed and direction is defined by a two-dimensional or three-dimensional speed vector.

7. The method of claim 6 wherein the consequent behaviors are combined by a vector sum of the two-dimensional or three-dimensional speed vectors.

8. The method of claim 1 wherein the comparison with the desired behavior is vector based.

9. The method of claim 1 wherein the feedback is provided during a real-time epoch when the multiple rules triggered as a reward or punishment based on the rule's corresponding contribution to the resultant behavior as compared to the desired behavior.

10. The method of claim 1 further comprising implementing the resultant behavior for the virtual character.

11. The method of claim 10 wherein the implemented resultant behavior is detected to determine its effectiveness in the virtual space when subjected to environmental influences of the virtual space so that further feedback is provided in the form of a reward or punishment.

12. The method of claim 11 wherein the further feedback is issued at the end of a real-time period before a next epoch starts.

13. The method of claim 12 further comprising a behavior reward for the actual behavior that was implemented.

14. The method of claim 1 wherein the feedback provides for a rule fitness adapted to be considered in a genetic operation with respect to how each rule contributed to the resultant behavior.

15. A non-transitory tangible computer readable medium having instructions thereon for implementing a method for controlling a virtual character in a virtual space comprising:
    defining a plurality of rules in a rules-based system, each of said rules defining a condition that determines a consequent behavior of a virtual agent when the rule is triggered by the condition being satisfied;
    upon triggering of multiple rules at the same time, combining all of the behaviors of the multiple rules whose conditions were satisfied into a resultant behavior for the virtual agent rather than selecting one of the consequent behaviors, so that the resultant behavior comprises a new combined operation for execution within the virtual space where each of the consequent behaviors partly contributes to the new combined operation;
    comparing the resultant behavior with a desired behavior; and
    providing feedback to each of the multiple rules based on a proportional amount of their corresponding contribution to the resultant behavior as compared to the desired behavior.

16. The non-transitory tangible computer readable medium of claim 15 wherein the consequent behavior is a movement in virtual space having a speed and direction defined by a two-dimensional or three-dimensional speed vector, wherein the consequent behaviors are combined by a vector sum of the two-dimensional or three-dimensional speed vectors.

17. The non-transitory tangible computer readable medium of claim 15 wherein the feedback is provided during a real-time epoch when the multiple rules triggered as a reward or punishment based on the rule's corresponding contribution to the resultant behavior as compared to the desired behavior.

18. A virtual reality system having a virtual character in a virtual space, comprising:
    a processor;
    a memory comprising a plurality of rules in a rules-based system, each of said rules defining a condition that determines a consequent behavior of a virtual agent when the rule is triggered by the condition being satisfied, wherein the program instructions are executable by the processor to:
    upon triggering of multiple rules at the same time, combine all of the consequent behaviors of the multiple rules whose conditions were satisfied into a resultant behavior for the virtual agent rather than selecting one of the consequent behaviors, so that the resultant behavior comprises a new combined operation for execution within the virtual space where each of the consequent behaviors partly contributes to the new combined operation;
    compare the resultant behavior with a desired behavior; and
    provide feedback to each of the multiple rules based on a proportional amount of their corresponding contribution to the resultant behavior as compared to the desired behavior.

19. The system of claim 18 wherein the consequent behavior is a movement in virtual space having a speed and direction defined by a two-dimensional or three-dimensional speed vector, wherein the consequent behaviors are combined by a vector sum of the two-dimensional or three-dimensional speed vectors.

20. The system of claim 18 wherein the feedback is provided during a real-time epoch when the multiple rules triggered as a reward or punishment based on the rule's corresponding contribution to the resultant behavior as compared to the desired behavior.

* * * * *